(12) United States Patent
Kang

(10) Patent No.: US 11,153,450 B2
(45) Date of Patent: Oct. 19, 2021

(54) PROVIDING OF USER INTERFACE SCREEN BASED ON DIFFERENT USER INTERFACE PLATFORMS

(71) Applicant: Hewlett-Packard Development Company, L.P., Spring, TX (US)

(72) Inventor: Soo-Young Kang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/768,799

(22) PCT Filed: Aug. 9, 2018

(86) PCT No.: PCT/KR2018/009080
§ 371 (c)(1),
(2) Date: Jun. 1, 2020

(87) PCT Pub. No.: WO2019/117421
PCT Pub. Date: Aug. 9, 2018

(65) Prior Publication Data
US 2021/0185186 A1    Jun. 17, 2021

(30) Foreign Application Priority Data
Dec. 14, 2017   (KR) .................. 10-2017-0172667

(51) Int. Cl.
*H04N 1/00* (2006.01)
(52) U.S. Cl.
CPC ....... *H04N 1/00503* (2013.01); *H04N 1/0097* (2013.01); *H04N 2201/0094* (2013.01)

(58) Field of Classification Search
CPC ............. H04N 1/00503; H04N 1/0097; H04N 2201/0094
USPC ....................................................... 358/1.13
See application file for complete search history.

(56) References Cited

U.S. PATENT DOCUMENTS

| | | | |
|---|---|---|---|
| 2009/0249282 A1 | 10/2009 | Meijer et al. | |
| 2009/0265646 A1 | 10/2009 | Cho et al. | |
| 2010/0037104 A1 | 2/2010 | Jung et al. | |
| 2011/0310431 A1* | 12/2011 | Uchikawa | H04N 1/00424 358/1.15 |
| 2013/0139075 A1* | 5/2013 | Park | G06F 9/445 715/762 |
| 2015/0350472 A1 | 12/2015 | Hirota et al. | |
| 2018/0124265 A1* | 5/2018 | Shibata | H04N 1/00503 |

FOREIGN PATENT DOCUMENTS

| | | |
|---|---|---|
| JP | 2014-41526 A | 3/2014 |
| JP | 2014-139749 A | 7/2014 |
| JP | 2014-186486 A | 10/2014 |
| JP | 2017-111804 A | 6/2017 |
| KR | 10-2008-0076304 A | 8/2008 |

(Continued)

*Primary Examiner* — Neil R McLean
(74) *Attorney, Agent, or Firm* — Jefferson IP Law, LLP

(57) ABSTRACT

An image forming apparatus and method for providing a user interface (UI) screen are provided. The image forming apparatus may include a processor to execute instructions stored in a memory to display applications running on different UI platforms supported by different operating systems, together on a home screen based on a main UI platform selected among the different UI platforms, on a UI device.

15 Claims, 7 Drawing Sheets

(56) References Cited

FOREIGN PATENT DOCUMENTS

| KR | 10-2011-0056843 A | 5/2011 |
| KR | 10-2014-0046916 A | 4/2014 |
| KR | 10-2014-0120243 A | 10/2014 |

\* cited by examiner

[Fig. 1]
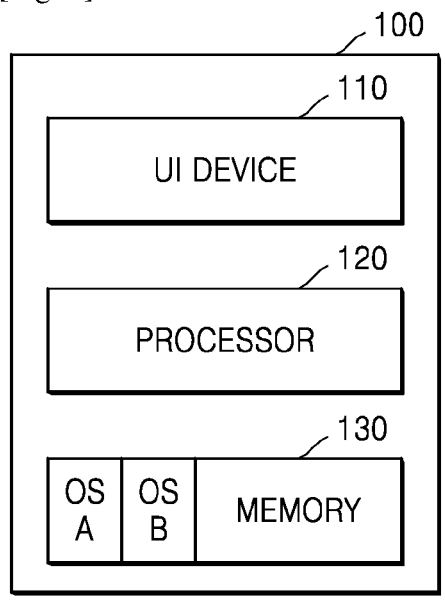
[Fig. 2]
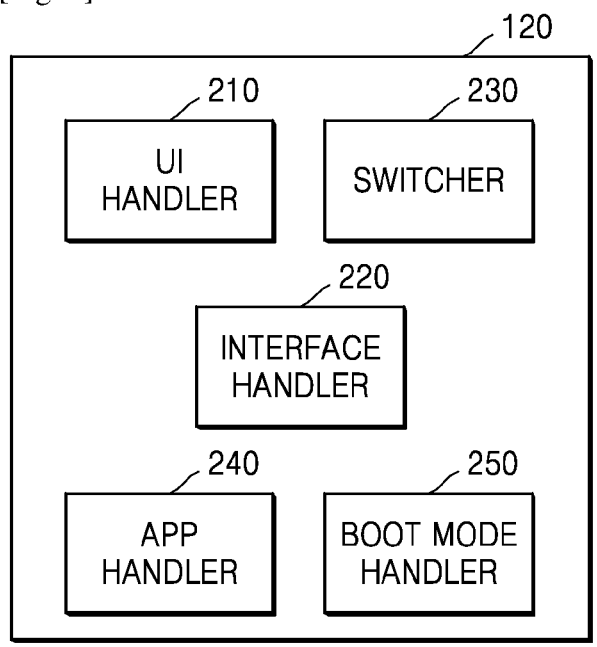

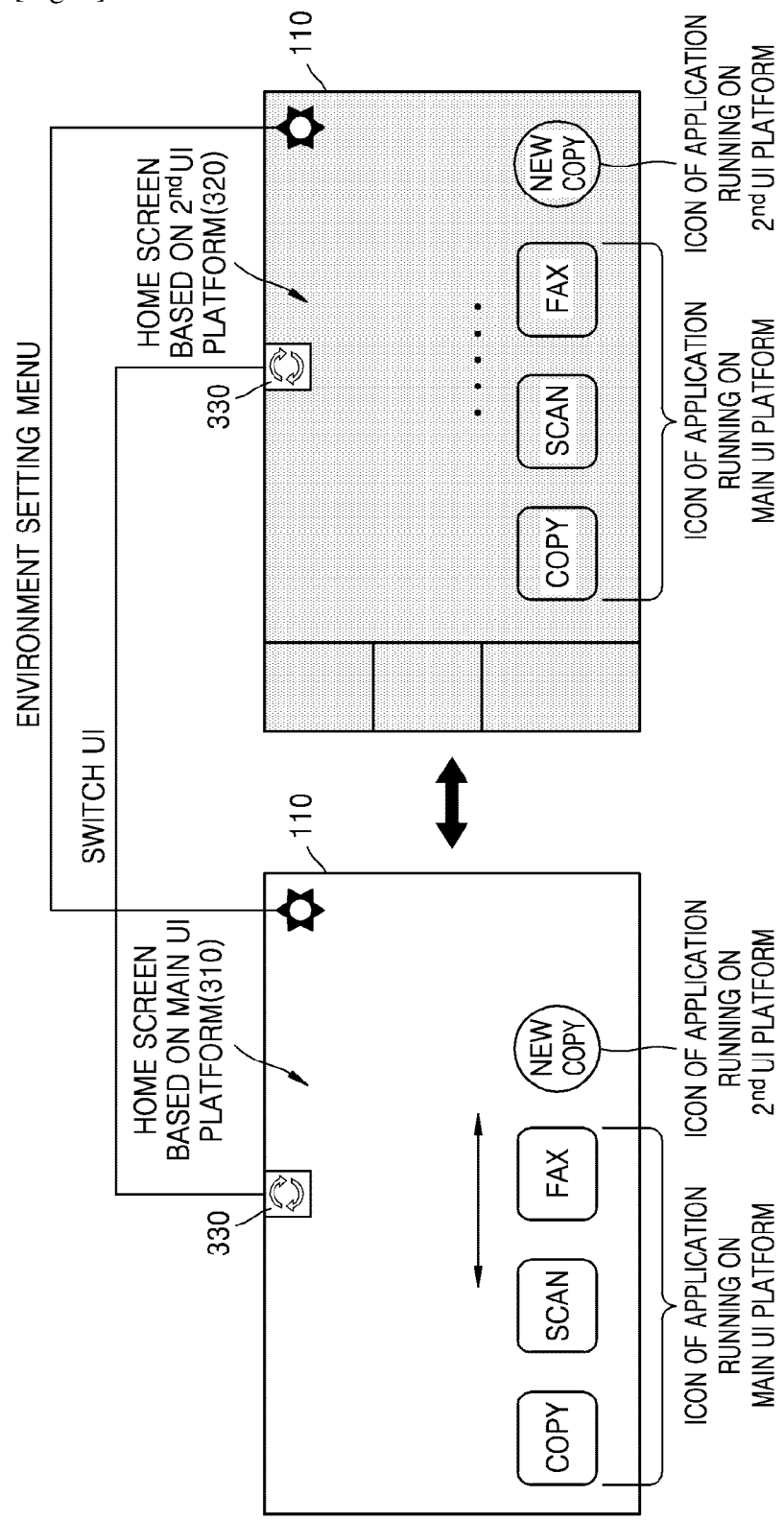

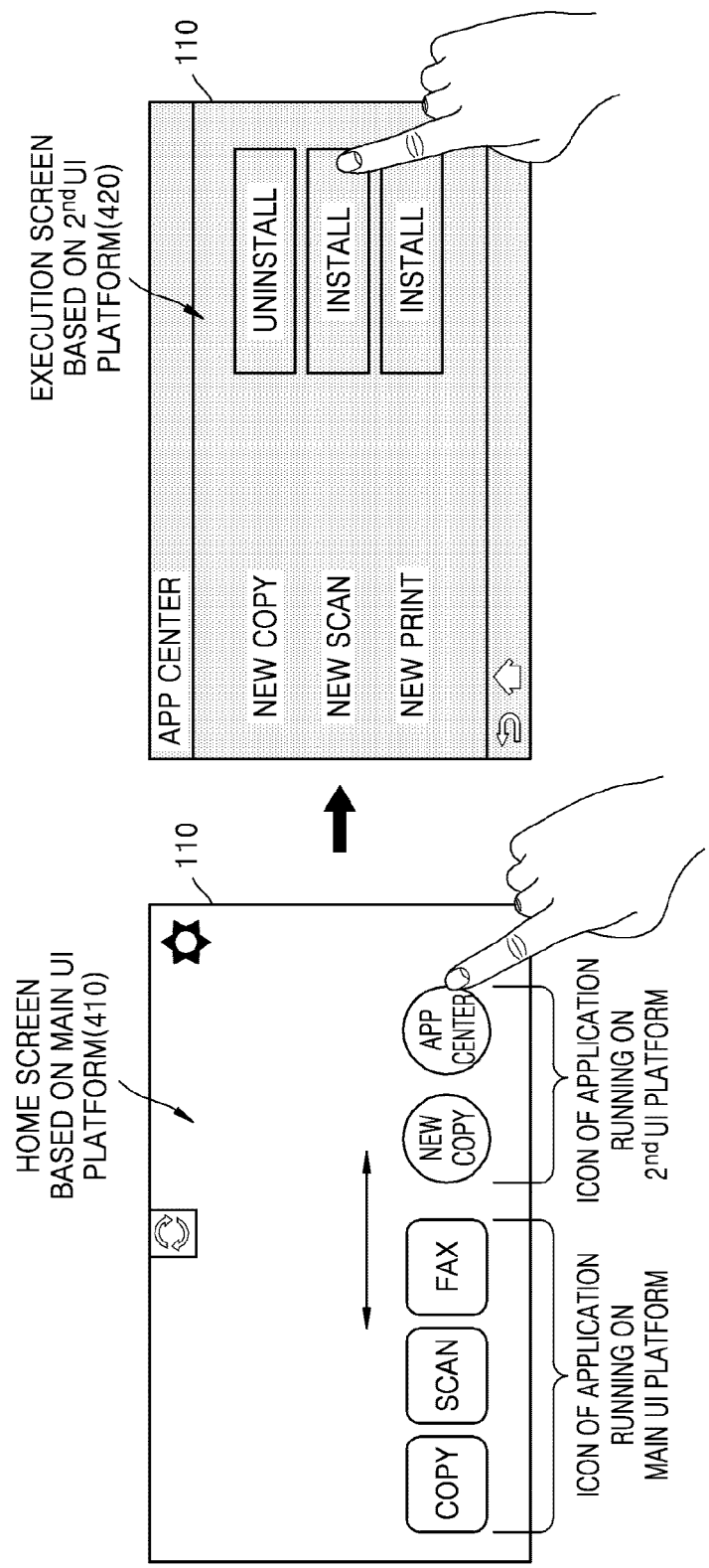
[Fig. 4]

[Fig. 5]
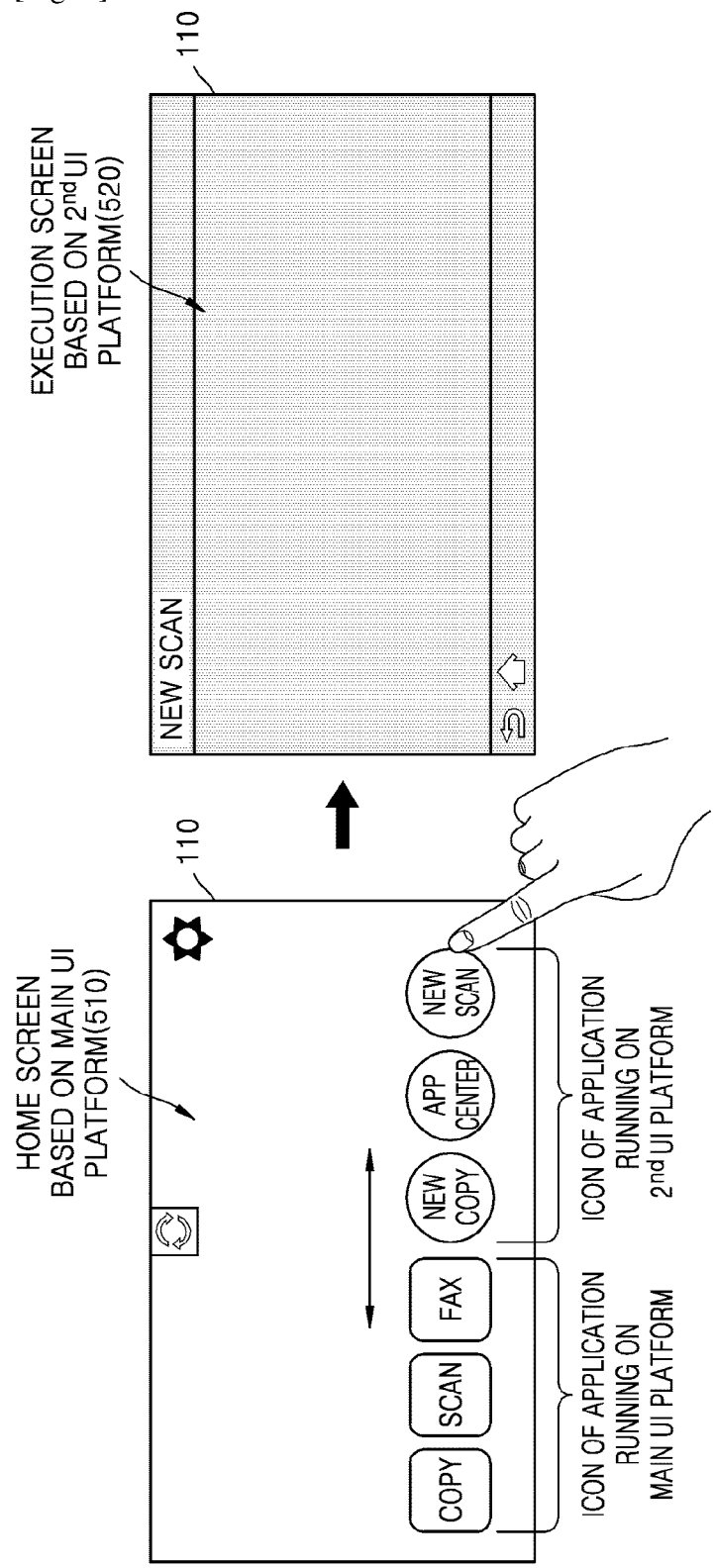

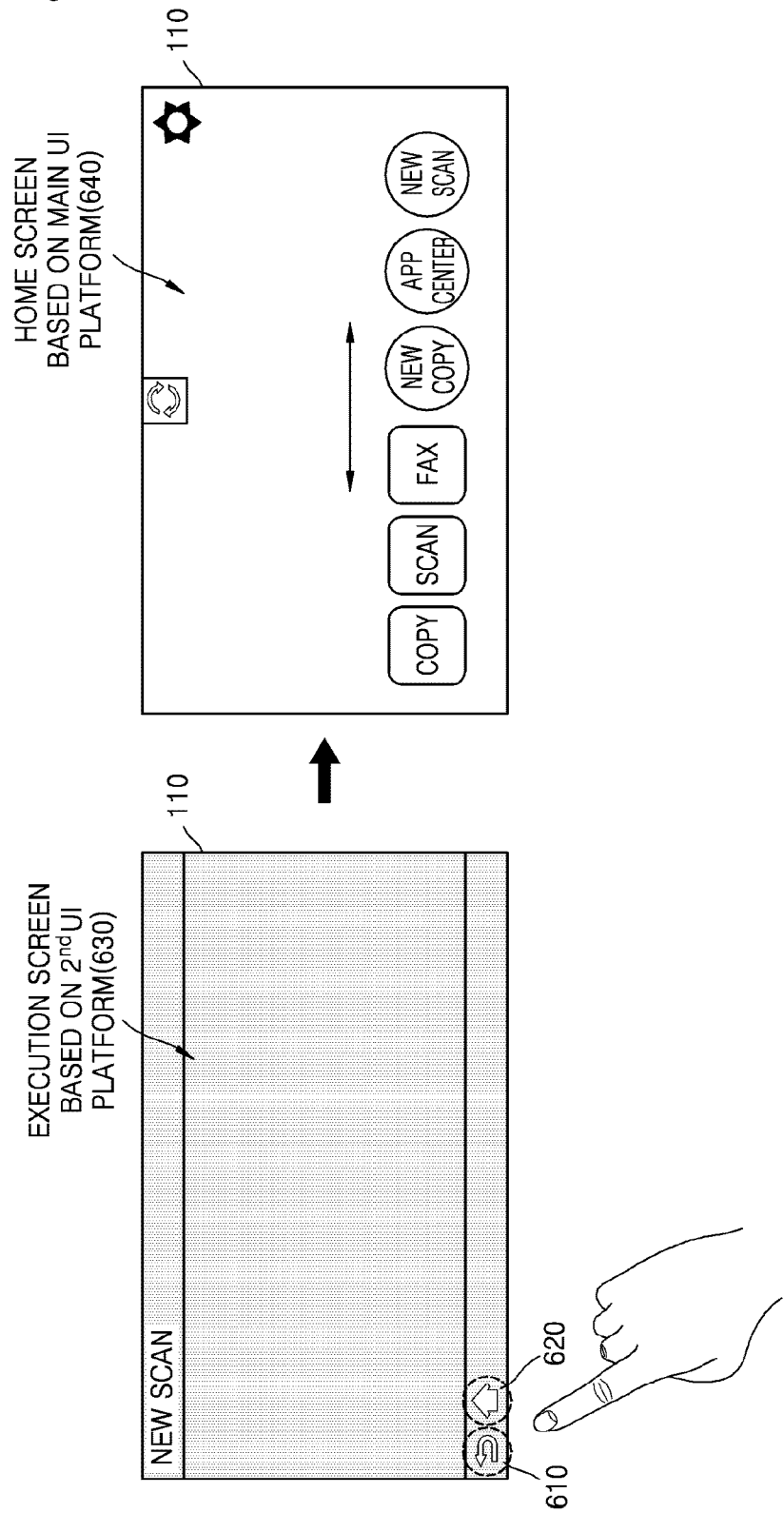

[Fig. 7]
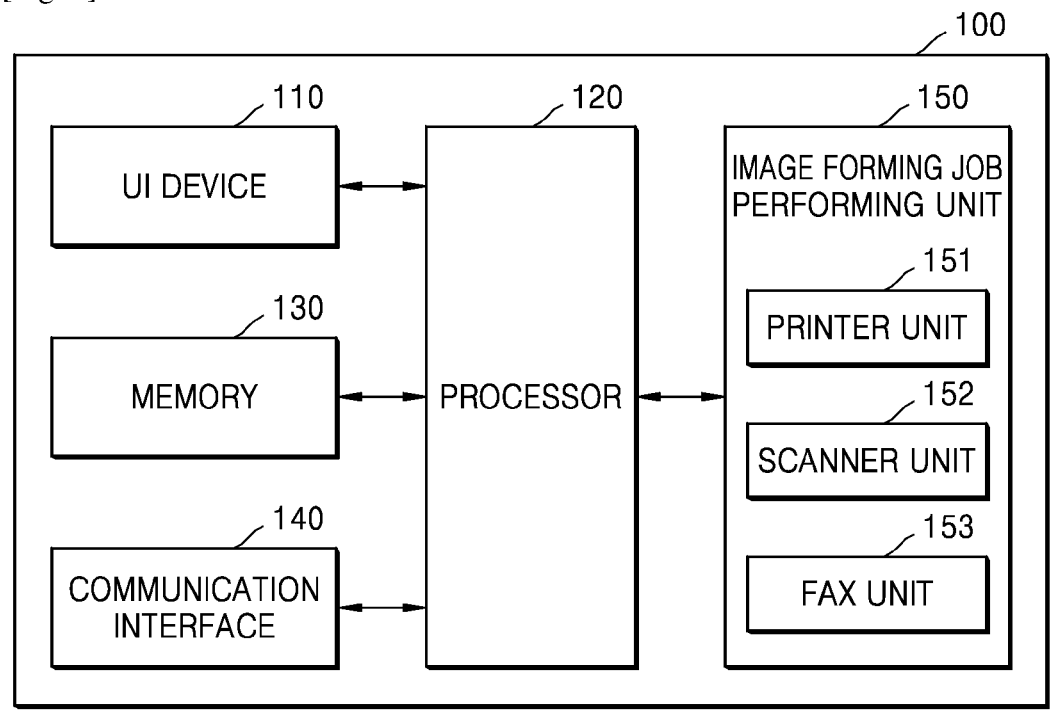
[Fig. 8]
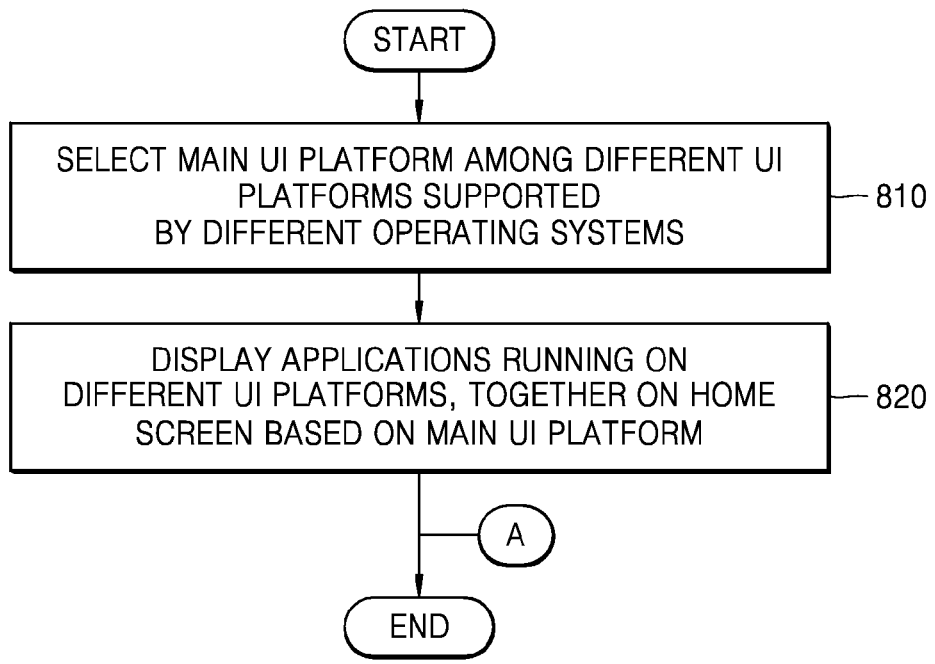

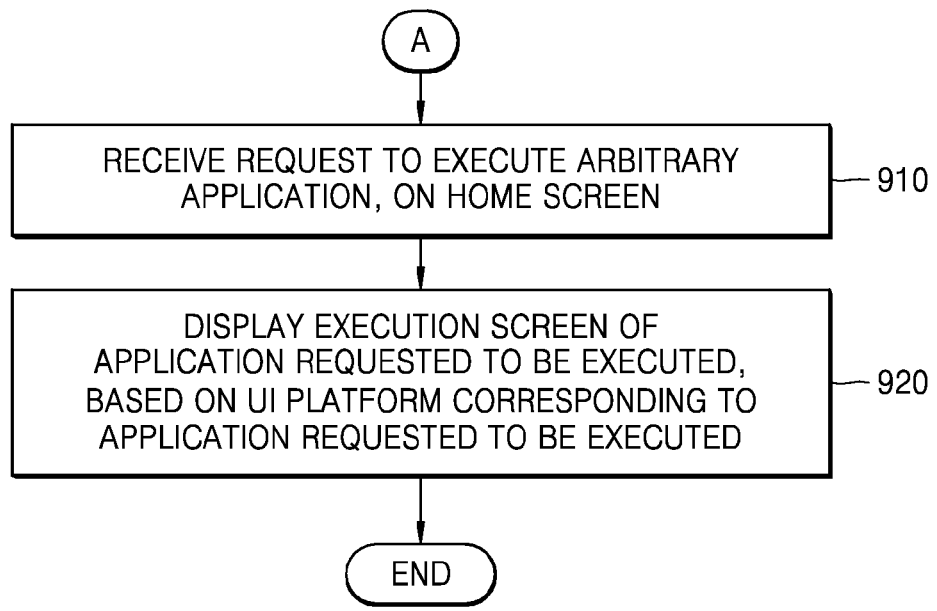
[Fig. 9]

PROVIDING OF USER INTERFACE SCREEN BASED ON DIFFERENT USER INTERFACE PLATFORMS

BACKGROUND ART

An Image forming apparatus such as a printer, a photocopier, a fax machine, a scanner, and a multifunction printer (MFP) includes a user interface (UI) used by a user to control an operation of the image forming apparatus, to input information, or the like. The image forming apparatus may have different UIs based on functions provided by and types of hardware and software used by the image forming apparatus.

DISCLOSURE OF INVENTION

BRIEF DESCRIPTION OF DRAWINGS

Various aspects, features, and advantages of examples of the present disclosure will be more apparent from the following description taken in conjunction with the accompanying drawings, in which:

FIG. 1 is a block diagram of an image forming apparatus according to an example;

FIG. 2 is a block diagram for describing an operation of a processor of an image forming apparatus, according to an example;

FIG. 3 illustrates a home screen based on a main user interface (UI) platform and a home screen based on a second UI platform, according to an example;

FIG. 4 is a diagram for describing a procedure of installing or uninstalling an application running on a second UI platform, by executing an App center application running on the second UI platform, on a home screen based on a main UI platform, according to an example;

FIG. 5 is a diagram for describing a procedure of switching from a home screen based on a main UI platform to an execution screen of an application running on a second UI platform, according to an example;

FIG. 6 is a diagram for describing a procedure of switching from an execution screen of an application running on a second UI platform to a home screen based on a main UI platform, according to an example;

FIG. 7 is a block diagram of an image forming apparatus according to another example; and FIGS. 8 and 9 are flowcharts of a method of providing UI screens on an image forming apparatus, according to an example.

Throughout the drawings, it should be noted that like reference numbers are used to depict the same or similar elements, features, parts, components, and structures.

MODE FOR THE INVENTION

Hereinafter, one or more examples will be described with reference to the attached drawings. In this regard, the examples may have different forms and should not be construed as being limited to the descriptions set forth herein. In order to further describe features of the examples, descriptions of other features that are well known to one of ordinary skill in the art are omitted here.

Expressions such as "at least one of," when preceding a list of elements, modify the entire list of elements and do not modify the individual elements of the list.

In the following description, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a copier, a scanner, a fax machine, a multifunction printer (MFP), a display apparatus, or the like.

Also, "print data" may denote data having a format printable by a printer and a "scan file" may denote a file generated by scanning an image by using a scanner.

FIG. 1 is a block diagram of an image forming apparatus according to an example.

Referring to FIG. 1, an image forming apparatus 100 may include a user interface (UI) device 110, a processor 120, and a memory 130. Although not illustrated, the image forming apparatus 100 may further include additional components, such as a power supply for supplying power to each component, etc.

The memory 130 may store instructions executable by the processor 120 and may store different operating systems. The different operating systems may support different UI platforms. The operating system and the UI platform may be separate from or integrated with each other.

The processor 120 may display applications running on the different UI platforms supported by the different operating systems. For example, the processor 120 may display applications running on the different UI platforms together on a home screen based on a main UI platform, selected among the different UI platforms, on the UI device 110 by executing the instructions stored in the memory 130. As an example, the processor 120 may select the main UI platform according to a preset value when the image forming apparatus 100 is booted. As another example, a user may set a UI platform, which is familiar to the user among a plurality of UI platforms, as the main UI platform by using an environment setting menu.

The processor 120 may generate different UI screens based on the different UI platforms. The UI screens may include a home screen, an execution screen of an application, a setting screen, etc. The processor 120 may select a UI screen to be displayed among the generated UI screens according to a preset value of the image forming apparatus 100 or according to a user input. The processor 120 may generate a home screen, an execution screen of an application, a setting screen, etc. based on each of the different UI platforms supported by the different operating systems, and may transmit a UI screen to be displayed to a frame buffer and display the same on the UI device 110 based on a user input.

FIG. 2 is a block diagram for describing an operation of a processor of an image forming apparatus, according to an example.

Referring to FIG. 2, the processor 120 may include a plurality of sub-modules to perform preset functions. As illustrated in FIG. 2, the processor 120 may include a UI handler 210, an interface handler 220, a switcher 230, an App handler 240, and a boot mode handler 250. Any of the sub-modules may be implemented as a hardware module or a software module.

The UI handler 210 may include UI screens to be displayed to a user, may configure a UI screen according to a user input, or the like.

The interface handler 220 may operate in a case when a user input is received from the UI handler 210, in a case when data, e.g., user information such as user authorization information, needs to be received from a main control board, or the like.

The switcher 230 may switch a UI platform according to a request of the interface handler 220 when the switching of the UI platform is requested according to a user input.

The App handler 240 may execute a preset application when a request to execute the application is received from the interface handler 220 according to a user input.

The boot mode handler 250 may determine a main UI platform among a plurality of UI platforms when the image forming apparatus 100 is booted.

Using a connection between the plurality of sub-modules, the processor 120 may switch a UI platform according to a user input and provide a UI screen on the UI device 110.

For example, when execution of an application running on a UI platform other than the main UI platform (hereinafter referred to as a second UI platform) is requested on a home screen based on the main UI platform, the UI handler 210 may receive the request to execute the application running on the second UI platform, and transmit the same to the interface handler 220. The interface handler 220 may request the switcher 230 to switch to the second UI platform, and request the App handler 240 to execute the application requested to be executed. The App handler 240 may execute the application requested to be executed.

When an input, such as a back button, a home button, a return button, or the like, is received from the user while the application running on the second UI platform is being executed, the App handler 240 may receive a request to display the home screen based on the main UI platform, and transmit the same to the interface handler 220. The interface handler 220 may request the switcher 230 to switch to the main UI platform, and request the UI handler 210 to display the home screen. The UI handler 210 may display the home screen based on the main UI platform.

FIG. 3 illustrates a home screen based on a main UI platform and a home screen based on a second UI platform, according to an example.

Referring to FIG. 3, a home screen 310 based on the main UI platform is illustrated at a left side of FIG. 3, and a home screen 320 based on the second UI platform is illustrated at a right side of FIG. 3. The two home screens may have different configurations or layouts of UI screens.

According to a request of a user, the home screen 310 based on the main UI platform may be switched to the home screen 320 based on the second UI platform, or the home screen 320 based on the second UI platform may be switched to the home screen 310 based on the main UI platform. The image forming apparatus 100 may switch from the home screen 310 based on the main UI platform to the home screen 320 based on the second UI platform according to a UI platform switching request of the user. Referring to FIG. 3, a virtual button 330 for the UI platform switching request may be located at a top center part of the home screen, but is not limited thereto. The user may adjust the location of the virtual button 330 to an arbitrary location of the home screen.

Either home screen 310 or 320 may be provided on the UI device 110 of the image forming apparatus 100, and applications running on the main UI platform and applications running on the second UI platform may be displayed together on the provided home screen. As illustrated in FIG. 3, copy, scan, and fax applications may be applications running on the main UI platform, and a new copy application may be an application running on the second UI platform.

The UI device 110 may distinguishably display icons of applications running on different UI platforms, on the home screen. Referring to FIG. 3, the copy, scan, and fax applications running on the main UI platform may be displayed with rectangular icons, and the new copy application running on the second UI platform may be displayed with a circular icon. However, this is only an example of distinguishably displaying icons of applications running on different UI platforms. In other examples, the icons may have different shapes besides rectangular and circular. Also, the icons may be displayed having different shading, coloring, size, depth, orientation, or the like.

The image forming apparatus 100 may display only icons of applications, which are permitted for a logged-in user based on log-in information of the user, on the home screen provided on the UI device 110. Referring to FIG. 3, the copy, scan, fax, and new copy applications may be applications permitted for the logged-in user.

The applications permitted for the user may be previously executed in a background. As such, when the user requests to execute an arbitrary application on the home screen, an execution screen of the application may be provided faster.

The user may input settings for UI screens such as the home screen by using an environment setting menu. For example, according to the settings for the home screen, an icon of an application based on a preset UI platform among icons of the applications running on the different UI platforms may be inactivated such that execution of an application running on a UI platform, which is not familiar to the user, may be prevented.

In response to a request to execute an arbitrary application on the home screen, the image forming apparatus 100 may display an execution screen of the application requested to be executed, based on a UI platform corresponding to the application requested to be executed. Referring to FIG. 3, on the home screen 310 based on the main UI platform or the home screen 320 based on the second UI platform in FIG. 3, the user may request to execute the copy, scan, or fax application running on the main UI platform or the new copy application running on the second UI platform. In response to the request to execute the application, the image forming apparatus 100 may display an execution screen of the application requested to be executed, based on a UI platform corresponding to the application. When the type of the UI platform corresponding to the home screen is different from that of the UI platform corresponding to the execution screen of the application requested to be executed, the UI platform may be automatically switched.

Examples of providing UI screens on the image forming apparatus 100 capable of supporting different UI platforms based on different operating systems will now be described with reference to FIGS. 4 to 6.

FIG. 4 is a diagram for describing a procedure of installing or uninstalling an application running on a second UI platform, by executing an App center application running on the second UI platform, on a home screen based on a main UI platform, according to an example.

Referring to FIG. 4, a user requests to execute the App center application, running on the second UI platform, on a home screen 410 based on the main UI platform. Thus, an execution screen 420 of the App center application based on the second UI platform is displayed. Since the home screen 410 at a left side of FIG. 4 is a UI screen based on the main UI platform and the execution screen 420 of the App center application at a right side of FIG. 4 is a UI screen based on the second UI platform, the UI platform may be switched. As illustrated in FIG. 4, when the user touches an icon of the App center application on the home screen 410 provided on the UI device 110, the main UI platform may be switched to the second UI platform and the execution screen 420 of the App center application based on the second UI platform may be displayed.

The user may install or uninstall an application running on the second UI platform using the execution screen 420 of the App center application. A list of installable or uninstallable applications may be received from an application server outside the image forming apparatus 100 and be displayed on the execution screen 420 of the App center application. As illustrated in FIG. 4, when the user requests to install a new scan application on the execution screen 420 of the App center application, which is provided on the UI device 110, the new scan application may be installed. Upon installation of the new scan application, an icon of the new scan application may be displayed on the home screen 410. The user may install or uninstall various applications running on the second UI platform, on the home screen 410 based on the main UI platform by using the App center application.

FIG. 5 is a diagram for describing a procedure of switching from a home screen based on a main UI platform to an execution screen of an application running on a second UI platform, according to an example.

Referring to FIG. 5, two applications capable of performing a scan function are displayed on a home screen 510 at a left side of FIG. 5. One is a scan application running on the main UI platform, and the other is a new scan application running on the second UI platform. A user, who is familiar with an execution screen of the scan application running on the main UI platform, may use the scan function by requesting to execute the scan application displayed as a rectangular icon. On the contrary, a user, who is familiar with an execution screen 520 of the new scan application running on the second UI platform, may use the scan function by requesting to execute the new scan application displayed as a circular icon.

As illustrated in FIG. 5, a user requests to execute the new scan application, running on the second UI platform, on the home screen 510 based on the main UI platform. Thus, the execution screen 520 of the new scan application based on the second UI platform is displayed. Since the home screen 510 at a left side of FIG. 5 is a UI screen based on the main UI platform and the execution screen 520 of the new scan application at a right side of FIG. 5 is a UI screen based on the second UI platform, the UI platform may be switched. As illustrated in FIG. 5, when the user touches the icon of the new scan application on the home screen 510, the main UI platform may be switched to the second UI platform and the execution screen 520 of the new scan application based on the second UI platform may be displayed.

In other words, in response to a request to execute an application running on a UI platform other than the main UI platform, the image forming apparatus 100 may switch from the main UI platform to the other UI platform and display an execution screen of the application requested to be executed, based on the switched UI platform.

FIG. 6 is a diagram for describing a procedure of switching from an execution screen of an application running on a second UI platform to a home screen based on a main UI platform, according to an example.

Referring to FIG. 6, a user inputs a back button 610, for returning to a previous UI screen, or a home button 620, for displaying the home screen, on an execution screen 630 of a new scan application based on the second UI platform. Thus, a home screen 640 based on the main UI platform is displayed. Since the execution screen 630 of the new scan application at a left side of FIG. 6 is a UI screen based on the second UI platform and the home screen 640 at a right side of FIG. 6 is a UI screen based on the main UI platform, the UI platform may be switched. As illustrated in FIG. 6, when the user touches a virtual button such as the back button 610 or the home button 620 on the execution screen 630 of the new scan application based on the second UI platform, the second UI platform may be switched to the main UI platform and the home screen 640 based on the main UI platform may be displayed.

In other words, in response to an input of the back button or the home button on an execution screen of an application requested to be executed, the image forming apparatus 100 may switch from the second UI platform, i.e., a UI platform other than the main UI platform, to the main UI platform and may display the home screen based on the main UI platform.

FIG. 7 is a block diagram of an image forming apparatus according to another example.

Referring to FIG. 7, the image forming apparatus 100 may include a UI device 110, a processor 120, a memory 130, a communication interface 140, and an image forming job performing unit 150. Although not shown in FIG. 7, the image forming apparatus 100 may further include a power supply configured to supply power to the other elements.

The UI device 110 may include an input unit configured to receive, from a user, an input for performing an image forming job, and an output unit configured to display information such as a result of performing the image forming job or status information of the image forming apparatus 100. For example, the UI device 110 may be implemented as a touchscreen including an operation panel configured to receive user inputs, and a display panel configured to display screens.

The UI device 110 may include an independent control system. In other words, independently of the processor 120 of the image forming apparatus 100, the UI device 110 may include a control system (e.g., a processor, a memory, etc.) for controlling a UI provided by the UI device 110. Also, an operating system for providing a UI and programs such as applications for supporting various functions may be installed in the control system of the UI device 110. As another example, the OS for providing the UI and the programs and applications may be installed in the memory 140 and accessed by the UI device 110.

The processor 120 may control overall operations of the image forming apparatus 100 and may include at least one processing unit such as a central processing unit (CPU). The processor 120 may control the other elements included in the image forming apparatus 100, to perform an operation corresponding to a user input received through the UI device 110. The processor 120 may include one or more specialized processing units corresponding to different functions, or include a single integrated processing unit.

The processor 120 may execute programs stored in the memory 130, read data or files stored in the memory 130, or store new files in the memory 130.

The memory 130 may have installed therein programs such as applications and have stored therein various types of data such as files. The processor 120 may access and use the data stored in the memory 130, or store new data in the memory 130. In addition, the processor 120 may execute the programs installed in the memory 130. The processor 120 may install, in the memory 130, an application received from an external source through the communication interface 140.

The communication interface 140 may communicate with another device or network in a wired or wireless manner. To this end, the communication interface 140 may include a communication module, such as a transceiver, supporting at least one of various wired and wireless communication schemes. For example, the communication module may be implemented as a chipset, a sticker/barcode including information required for communication (e.g. a sticker including a near-field communication (NFC) tag), or the like.

Wireless communication may include at least one of, for example, Wireless Fidelity (Wi-Fi), Wi-Fi Direct, Bluetooth, Ultra-Wide Band (UWB), NFC, or the like. Wired communication may include at least one of, for example, Universal Serial Bus (USB), High Definition Multimedia Interface (HDMI), or the like.

The communication interface 140 may be connected to and transmit and receive signals or data to and from an external device located outside the image forming apparatus 100. The communication interface 140 may transmit signals or data received from the external device, to the processor 120, or transmit signals or data generated by the processor 120, to the external device. For example, when the communication interface 140 receives a print command signal and print data from the external device, the processor 120 may output the received print data through a printer unit 151.

The image forming job performing unit 150 may perform an image forming job such as printing, copying, scanning, or faxing. Referring to FIG. 7, the image forming job performing unit 150 includes the printer unit 151, a scanner unit 152, and a fax unit 153. However, as necessary, the image forming job performing unit 150 may include only a part of the above-mentioned elements, or may further include an element configured to perform another type of image forming job. The image forming job performing unit 150 may perform the image forming job based on a command obtained by reconfiguring a user input received through the UI device 110.

The printer unit 151 may form an image on a recording medium based on various print schemes such as an electrophotography scheme, an inkjet scheme, a thermal transfer scheme, a thermosensitive scheme, or the like.

The scanner unit 152 may read an image recorded on a document, by projecting light onto the document and receiving reflected light onto an image sensor. As an image sensor for reading an image from a document, for example, a charge coupled device (CCD) or a contact type image sensor (CIS) may be employed. The scanner unit 152 may have a flatbed structure in which the document is located at a fixed position and the image sensor reads an image while moving, a document feed structure in which the image sensor is located at a fixed position and the document is fed, or a combination thereof.

The fax unit 153 may share an image scanning configuration with the scanner unit 152, share a file printing configuration with the printer unit 151, and transmit a scanned file to a destination or receive a file from outside.

The above-described elements of the image forming apparatus 100 may be named differently. The image forming apparatus 100 according to the present disclosure may include at least one of the above-described elements, and some elements may be omitted or additional elements may be further included.

FIGS. 8 and 9 are flowcharts of a method of providing UI screens on an image forming apparatus, according to an example. Although not repeated below, the above descriptions may be equally applied to the method of providing the UI screens on an image forming apparatus.

FIG. 8 illustrates a procedure of providing a home screen on an image forming apparatus, according to an example, and FIG. 9 illustrates a procedure of providing an execution screen of an application on an image forming apparatus, according to an example.

Referring to FIG. 8, the image forming apparatus 100 may select a main UI platform among different UI platforms supported by different operating systems in operation 810. The image forming apparatus 100 may select the main UI platform according to a preset value when the image forming apparatus 100 is booted. However, even when the image forming apparatus 100 is in use after being booted, the image forming apparatus 100 may switch from a home screen based on the main UI platform to a home screen based on a second UI platform according to a UI platform switching request of a user.

In operation 820, the image forming apparatus 100 may display applications running on the different UI platforms, together on the home screen based on the main UI platform. For example, applications running on the main UI platform and applications running on the second UI platform may be displayed together on the home screen based on the main UI platform. In this case, the image forming apparatus 100 may distinguishably display icons of the applications running on the different UI platforms, on the home screen.

Referring to FIG. 9, the image forming apparatus 100 may receive a request to execute an arbitrary application, on the home screen in operation 910. The user may request to execute an application running on the main UI platform or an application running on the second UI platform, on the home screen.

In operation 920, the image forming apparatus 100 may display an execution screen of the application requested to be executed, based on a UI platform corresponding to the application requested to be executed. In this case, when the type of the UI platform corresponding to the application requested to be executed is different from that of the UI platform corresponding to the home screen, the UI platform may be automatically switched.

For example, the image forming apparatus 100 may receive a request to execute an application running on a UI platform other than the main UI platform. In response to the request to execute the application, the image forming apparatus 100 may switch from the main UI platform to the other UI platform and display the execution screen of the application requested to be executed, based on the switched UI platform. The image forming apparatus 100 may receive an input of a back button or a home button on the execution screen of the application requested to be executed. In response to the input of the back button or the home button, the image forming apparatus 100 may switch from the other UI platform to the main UI platform and display the home screen based on the main UI platform.

The above-described method of providing the UI screens on the image forming apparatus 100 may also be embodied in the form of a non-transitory computer-readable recording medium having recorded thereon instructions or data executable by a computer or a processor. The method can be written as a computer program and can be implemented in a general-use digital computer that executes the program using a computer-readable recording medium. Examples of the non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tape, floppy disks, magneto-optical data storage devices, optical data storage devices, hard disks, solid-state disks (SSDs), or any devices capable of storing instructions or software, related data, data files, and data structures, and of providing the instructions or software, related data, data files, and data structures to a processor or computer in such a manner that the processor or computer executes the instructions.

While one or more examples have been described with reference to the figures, it will be understood by those of ordinary skill in the art that various changes in form and details may be made therein. For example, even if the techniques described herein are implemented in a different order from the method described herein and/or the elements described herein, such as a system, a structure, an apparatus, and a circuit, are coupled or combined in a different form from the method described herein or are replaced or substituted with other elements or equivalents, a proper result may be achieved.

Therefore, the scope of the disclosure is defined not by the examples described herein but by the following claims and equivalents thereof.

The invention claimed is:

1. An image forming apparatus for providing a user interface (UI) screen, the image forming apparatus comprising:
a UI device;
a processor; and
a memory storing instructions executable by the processor,
wherein the processor executes the instructions to:
display applications, running on different UI platforms supported by different operating systems, together on a home screen based on a main UI platform selected among the different UI platforms, on the UI device, and
display, on the home screen based on the main UI platform, a virtual button to switch to a home screen based on a second UI platform among the different UI platforms, wherein the home screen based on the second UI platform is to display together the applications running on the different UI platforms supported by different operating systems that are displayed together on the home screen based on the main UI platform.

2. The image forming apparatus of claim 1, wherein the processor further executes the instructions to select the main UI platform according to a preset value when the image forming apparatus is booted.

3. The image forming apparatus of claim 1, wherein the processor further executes the instructions to distinguishably display icons of the applications running on the different UI platforms.

4. The image forming apparatus of claim 1, wherein the processor further executes the instructions to switch from the home screen based on the main UI platform to the home screen based on the second UI platform according to a selection of the virtual button.

5. The image forming apparatus of claim 1, wherein the processor further executes the instructions to display, in response to a request to execute an arbitrary application on the home screen based on the main UI platform, an execution screen of the application requested to be executed, based on a UI platform corresponding to the application requested to be executed.

6. The image forming apparatus of claim 1, wherein the processor further executes the instructions to switch, in response to a request to execute an application running on a UI platform other than the main UI platform, from the main UI platform to the other UI platform and display an execution screen of the application requested to be executed, based on the switched UI platform.

7. The image forming apparatus of claim 6, wherein the processor further executes the instructions to switch, in response to an input of a back button or a home button on the execution screen of the application requested to be executed, from the other UI platform to the main UI platform and display the home screen based on the main UI platform.

8. The image forming apparatus of claim 1,
wherein the memory stores the different operating systems, and
wherein the processor further executes the instructions to generate different UI screens based on the different UI platforms.

9. The image forming apparatus of claim 8, wherein the processor further executes the instructions to select a UI screen to be displayed among the generated UI screens according to a user input.

10. The image forming apparatus of claim 1, wherein the processor further executes the instructions to inactivate an icon of an application based on a preset UI platform among icons of the applications running on the different UI platforms, according to settings for the home screen based on the main UI platform.

11. A method of providing a user interface (UI) screen on an image forming apparatus, the method comprising:
selecting a main UI platform among different UI platforms supported by different operating systems;
displaying applications, running on the different UI platforms, together on a home screen based on the main UI platform; and
displaying, on the home screen based on the main UI platform, a virtual button to switch to a home screen based on a second UI platform among the different UI platforms,
wherein the home screen based on the second UI platform is to display together the applications running on the different UI platforms that are displayed together on the home screen based on the main UI platform.

12. The method of claim 11, further comprising:
receiving a request to execute an arbitrary application, on the home screen based on the main UI platform; and
displaying an execution screen of the application requested to be executed, based on a UI platform corresponding to the application requested to be executed.

13. The method of claim 11, further comprising:
receiving a request to execute an application running on a UI platform other than the main UI platform; and
switching, in response to the request to execute the application, from the main UI platform to the other UI platform and displaying an execution screen of the application requested to be executed, based on the switched UI platform.

14. The method of claim 13, further comprising:
receiving an input of a back button or a home button on the execution screen of the application requested to be executed; and
switching, in response to the input of the back button or the home button, from the other UI platform to the main UI platform and displaying the home screen based on the main UI platform.

15. A non-transitory computer-readable recording medium having recorded thereon instructions executable by a processor and comprising:

instructions for selecting a main user interface (UI) platform among different UI platforms supported by different operating systems;

instructions for displaying applications running on the different UI platforms, together on a home screen based on the main UI platform: and instructions for displaying, on the home screen based on the main UI platform, a virtual button to switch to a home screen based on a second UI platform among the different UI platforms, wherein the home screen based on the second UI platform is to display together the applications running on the different UI platforms that are displayed together on the home screen based on the main UI platform.

* * * * *